(12) United States Patent
Kwon et al.

(10) Patent No.: US 8,119,297 B2
(45) Date of Patent: Feb. 21, 2012

(54) IDLE STOP-START CONTROL METHOD OF FUEL CELL HYBRID VEHICLE

(75) Inventors: Sang Uk Kwon, Gyeonggi-do (KR); Seo Ho Choi, Seoul (KR); Nam Woo Lee, Gyeonggi-do (KR); Seong Pil Ryu, Gyeonggi-do (KR); Sun Soon Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 537 days.

(21) Appl. No.: 12/361,008

(22) Filed: Jan. 28, 2009

(65) Prior Publication Data
US 2010/0009219 A1      Jan. 14, 2010

(30) Foreign Application Priority Data
Jul. 8, 2008   (KR) .................. 10-2008-0065805

(51) Int. Cl.
*H01M 8/04*     (2006.01)
(52) U.S. Cl. .................................................. 429/429
(58) Field of Classification Search ........... 429/428–432
See application file for complete search history.

(56) References Cited

U.S. PATENT DOCUMENTS

| | | | | |
|---|---|---|---|---|
| 7,501,195 | B2* | 3/2009 | Aoyama et al. | 429/429 |
| 7,771,856 | B2* | 8/2010 | Yoshida et al. | 429/432 |
| 2009/0325004 | A1* | 12/2009 | Choi et al. | 429/13 |
| 2010/0089672 | A1* | 4/2010 | Lee et al. | 180/65.275 |

FOREIGN PATENT DOCUMENTS

| | | |
|---|---|---|
| JP | 03842015 A | 12/2001 |
| JP | 2005-174855 | 6/2005 |
| JP | 2006-202554 | 8/2006 |
| JP | 2006-318764 | 11/2006 |
| JP | 2006-331774 | 12/2006 |
| JP | 2007-265653 A | 10/2007 |

* cited by examiner

*Primary Examiner* — Chandrika Prasad
(74) *Attorney, Agent, or Firm* — Edwards Wildman Palmer LLP; Peter F. Corless

(57) ABSTRACT

The present invention provides an idle stop-start control method of a fuel cell hybrid vehicle including a fuel cell as a main power source and a storage means as an auxiliary power source, in which air and hydrogen supply is cut off during low power operation where the efficiency of the fuel cell is low and during regenerative braking such that residual oxygen and hydrogen are consumed to drop the voltage of a fuel cell stack, thus stopping the operation of the fuel cell.

7 Claims, 15 Drawing Sheets

IDLE STOP-START CONTROL METHOD OF FUEL CELL HYBRID VEHICLE

CROSS-REFERENCE TO RELATED APPLICATION

This application claims under 35 U.S.C. §119(a) the benefit of Korean Patent Application No. 10-2008-0065805 filed Jul. 8, 2008, the entire contents of which are incorporated herein by reference.

BACKGROUND (a) Technical Field

The present invention relates to an idle stop-start control method of a fuel cell hybrid vehicle. More particularly, the present invention relates to a fuel cell stop-restart control method for improving fuel efficiency and increasing the amount of regenerative braking in a fuel cell-storage means hybrid vehicle including a fuel cell as a main power source and a storage means (e.g. supercapacitor or battery) as an auxiliary power source.

(b) Background Art

A fuel cell is an electricity generation system that does not convert the chemical energy of fuel into heat by combustion, but electrochemically converts the chemical energy directly into electrical energy in a fuel cell stack. Such a fuel cell can be applied to the supply of electric power for small-sized electrical/electronic devices such as portable devices, as well as to the supply of electric power for industry, homes, and vehicles.

At present, the most preferred fuel cell for a vehicle is a polymer electrolyte membrane fuel cell (PEMFC), also called a proton exchange membrane fuel cell, that preferably comprises: a membrane electrode assembly (MEA) including a polymer electrolyte membrane (PEM) for transporting hydrogen ions and an electrode catalyst layer, in which an electrochemical reaction takes place, disposed on both sides of the PEM; a gas diffusion layer (GDL) for uniformly diffusing reactant gases and transmitting generated electricity; a gasket and a sealing member for maintaining airtightness of the reactant gases and coolant and providing an appropriate bonding pressure; and a bipolar plate for transferring the reactant gases and coolant.

In the fuel cell having the above-described configuration, hydrogen as a preferred fuel and oxygen (air) as a preferred oxidizing agent are supplied to an anode and a cathode through flow fields of the bipolar plate, respectively. The hydrogen is suitably supplied to the anode (also called a "fuel electrode", "hydrogen electrode", and "oxidation electrode") and the oxygen (air) is suitably supplied to the cathode (also called an "air electrode", "oxygen electrode", and "reduction electrode"). The hydrogen supplied to the anode is dissociated into hydrogen ions (protons, $H^+$) and electrons ($e^-$) by catalyst of the electrode catalyst layer preferably provided on both sides of the electrolyte membrane. At this time, only the hydrogen ions are selectively transmitted to the cathode through the electrolyte membrane, which is preferably a cation exchange membrane and, at the same time, the electrons are transmitted to the anode through the GDL and the bipolar plate, which are conductors. At the cathode, the hydrogen ions supplied through the electrolyte membrane and the electrons transmitted through the bipolar plate meet the oxygen in the air supplied to the cathode by an air supplier and cause a reaction that produces water. Due to the movement of hydrogen ions occurring at this time, the flow of electrons through an external conducting wire occurs, and thus a current is suitably generated.

If the fuel cell is used as the only power source of an electric vehicle, the fuel cell powers all loads of the vehicle, which results in performance deterioration during operation where the efficiency of the fuel cell is low. Moreover, during high speed operation where a high voltage is required, a sufficient voltage required by a drive motor is not supplied due to a rapid decrease in output voltage, thus decreasing acceleration performance. Furthermore, if a sudden load is applied to the vehicle, the output voltage of the fuel cell suddenly drops and sufficient power is not supplied to the drive motor, thus decreasing vehicle performance (accordingly, a sudden change in load imposes a heavy burden on the fuel cell since electricity is generated by an electrochemical reaction). In addition, since the fuel cell preferably has unidirectional output characteristics, it is impossible to recover energy from the drive motor during braking of the vehicle, thus decreasing the efficiency of the vehicle system.

Accordingly, a fuel cell hybrid vehicle has been developed. Exemplary fuel cell hybrid vehicles include large vehicles, such as a bus, as well as small vehicles that are preferably equipped with storage means such as a high voltage battery or a supercapacitor as an auxiliary power source for suitably providing the power required for driving the motor in addition to the fuel cell as a main power source. At present, a fuel cell-storage means hybrid vehicle that does not employ a power converter has been studied, and the fuel cell-storage means hybrid vehicle has high fuel efficiency (e.g. high regenerative braking, high efficiency of supercapacitor, and without the use of the power converter), an increase in durability of the fuel cell, suitably high reliability control, and the like.

In the hybrid vehicle in which the fuel cell and the storage means are preferably directly connected, the fuel cell continuously outputs power at a suitably constant level during driving. If electric power is suitably sufficient, the storage means is charged with surplus power, whereas, if the electric power is insufficient, the storage means supplies the insufficient power to drive the vehicle.

An exemplary configuration of a fuel cell-supercapacitor hybrid vehicle is described below FIG. 1 is an exemplary configuration diagram showing a power system of a fuel cell-supercapacitor hybrid vehicle preferably including: a fuel cell 2 suitably used as a main power source, a supercapacitor 10 suitably used as an auxiliary power source, a supercapacitor precharge unit 9 preferably interposed between a main bus terminal 3, which is an output port of the fuel cell 2, and the supercapacitor 10, and a motor control unit (MCU) (with an inverter), which is a power module for rotating a drive motor 8, connected to output ports of the fuel cell 2 and the supercapacitor 10, producing a 3-phase pulse width modulation (PWM) by receiving direct current therefrom, and controlling the motor drive and the regenerative braking. In preferred embodiments, the supercapacitor precharge unit 9 is used only to charge the discharged supercapacitor during initial start-up.

The above-described fuel cell-supercapacitor hybrid vehicle uses the fuel cell 2 as the main power source, which preferably receives hydrogen from a hydrogen tank 1 and air from an air blower (not shown) to suitably generate electricity by an electrochemical reaction between hydrogen and oxygen in the air. The drive motor 8 and the MCU 7 are preferably connected to the fuel cell 2 through the main bus terminal 3, and the supercapacitor 10 is connected to the fuel cell 2 through the supercapacitor precharge unit 9 to provide power assist and regenerative braking. Moreover, a low voltage DC-DC converter (LV DCDC) 11 for power conversion between high voltage and low voltage and a low voltage battery (12V auxiliary battery) 12 for driving fuel cell balance-of-plant (BOP) components 16 are connected to the main bus terminal 3. Furthermore, an air conditioner 13 and a heater 14, which are operated by receiving high voltage power through the main bus terminal 3, are suitably connected to the main bus terminal 3.

The fuel cell BOP components 16 such as an air blower, a hydrogen recirculation blower, a water pump, etc. for driving the fuel cell 2 are connected to the main bus terminal 3 to facilitate the start-up of the fuel cell 2. Moreover, relays 4 and 5 for facilitating connection and disconnection of power and a blocking diode 6 for preventing a reverse current from flowing to the fuel cell 2 are provided in the main bus terminal 3.

Reference numeral 15 denotes a driver of the fuel cell BOP components 16, and 17 denotes a heater for supplying heat to facilitate cold start of the fuel cell 2.

In order to facilitate understanding of the present invention, the configuration of a fuel cell system will be briefly described. FIG. 2 shows an exemplary air supplier and an exemplary hydrogen supplier. As shown in the figure, dry air supplied through an air blower 28 is humidified by a humidifier 29 and supplied to a cathode of a fuel cell stack 2. Preferably, exhaust gas of the cathode, humidified with water generated from the cathode, is delivered to the humidifier 29 and used to humidify dry air to be supplied to the cathode by the air blower 28.

The hydrogen supplier preferably comprises two lines. The first line supplies hydrogen to an anode of the fuel cell stack 2 through a low pressure regulator (LPR) 23, and a portion of hydrogen at an outlet port of the anode is recirculated through a recirculation blower 24. The second line supplies hydrogen at high pressure to the anode through a valve 25 and an ejector 26, and a portion of hydrogen from the outlet port of the anode is recirculated and supplied through the ejector 26.

Moreover, hydrogen remaining in the anode directly passes through an electrolyte membrane without generation of electricity and reacts with oxygen in the cathode, which is called "crossover". In order to reduce the amount of hydrogen crossover, it is necessary to suitably reduce the anode pressure during low power operation and increase the anode pressure during high power operation wherein the output of the fuel cell stack is suitably increased. To this end, the low pressure regulator 23 is used singly when low pressure is required, and hydrogen at high pressure is supplied by controlling the valve 25 when high power is required or during hydrogen purging. Accordingly, the higher the anode (hydrogen) pressure is, the more the amount of hydrogen crossover is suitably increased. Since the hydrogen crossover effects the fuel efficiency and durability of the fuel cell, it is necessary to maintain a suitably appropriate anode pressure. A hydrogen purge valve 27 is used to discharge impurities and condensed water in the anode, thus ensuring the performance of the fuel cell stack. Preferably, the outlet port of the anode is connected to a water trap 31 such that the condensed water stored in the water trap 31 is discharged through a valve 32 if the amount of condensed water reaches a predetermined level.

The driving mode of the hybrid vehicle including the fuel cell as the main power source and the supercapacitor (or a high voltage battery which is a secondary battery) as the auxiliary power source preferably includes an electric vehicle (EV) mode in which the motor is driven only by the power of the fuel cell, a hybrid electric vehicle (HEV) mode in which the motor is driven by the fuel cell and the supercapacitor at the same time, and a regenerative braking (RB) mode in which the supercapacitor is charged.

However, in fuel cell-supercapacitor hybrid vehicle the supercapacitor is automatically charged by the fuel cell, which thus restricts the regenerative braking. Accordingly, stopping the operation of the fuel cell during low power operation and during regenerative braking will overcome this restriction. Moreover, it is possible to improve the fuel efficiency by restricting the use of the fuel cell during low power operation where the efficiency of the fuel cell is low.

To improve the fuel efficiency, the fuel cell stop/restart process is considered, i.e., an idle stop-start control process, in which the power generation of the fuel cell is stopped and restarted (the fuel cell is turned on and off), if necessary, during driving of the fuel cell-battery or fuel cell-supercapacitor hybrid vehicle. The idle stop of the fuel cell during driving of the vehicle is suitably distinguished from the shut-down of the fuel cell system after the vehicle operation is finished. Accordingly, it is necessary to distinguish a control process for the idle stop of the fuel cell from a control process for the shut-down of the fuel cell system.

U.S. Patent Publication No. 20030118876 discloses a technique in which a relay switch, connected between a fuel cell and a supercapacitor, is turned off to disconnect the output of the fuel cell during low power operation, or if the voltage of the supercapacitor is above a suitably predetermined level, and the relay switch is turned on to connect the output of the fuel cell if an output required by the vehicle is increased or if the voltage of the supercapacitor is below a suitably predetermined level. In this technique, the relay switch of a main bus terminal for disconnecting the output of the fuel cell is turned on and off to achieve the idle stop/start, and accordingly a separate relay on/off control is required.

U.S. Pat. No. 6,484,075 describes a technique in which the fuel cell power supply is cut off by determining an idle state that is based on a wheel rotational speed, whether or not a brake is operated, a state of charge (SOC), an electrical load, and the like, and wherein the fuel cell power supply is restarted if a power storage unit is below a predetermined SOC. Here, the conditions for entering the idle stop are considerably restrictive (e.g. the idle stop is performed if the vehicle stopped, if the load is below a predetermined value, if the brake is in an operation state, and if the SOC is above a predetermined value). Moreover, a separate device such as a DC/DC chopper is required at the fuel cell for the idle stop, and the DC/DC chopper is directly connected to the supercapacitor during releasing the idle stop state after the DC/DC chopper is used to limit the current.

Accordingly, it is preferable to provide a method for stopping and restarting the power generation of the fuel cell by a suitably simplified control process, while improving the fuel efficiency of the fuel cell and increasing the amount of regenerative braking. It is preferable to provide a method for maintaining the fuel cell at an optimal state even in a non-power generation region since the durability of the fuel cell may be decreased if the fuel cell stop region is suitably increased.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an idle stop-start control method for improving fuel efficiency and increasing the amount of regenerative braking in a fuel cell-storage means hybrid vehicle including a fuel cell as a main power source and a storage means (supercapacitor or battery) as an auxiliary power source. Moreover, the present invention provides a method for maintaining a fuel cell at an optimal state in a non-power generation region of the fuel cell.

In one embodiment, the present invention provides an idle stop-start control method of a fuel cell hybrid vehicle preferably including a fuel cell as a main power source and a storage means as an auxiliary power source, the method comprising: determining whether to perform a fuel cell stop mode by determining conditions for stopping power generation of the fuel cell; performing the fuel cell stop mode, preferably in which the current output from a fuel cell stack is suitably cut off by stopping the supply of reactant gases to the fuel cell, if the fuel cell stop mode is determined; and preferably performing a fuel cell restart mode, for example by restarting the supply of air and hydrogen, if conditions for restarting the fuel cell are satisfied in the fuel cell stop mode.

In a preferred embodiment, the step of determining whether to perform the fuel cell stop mode preferably comprises: comparing a voltage of the storage means with a predetermined reference voltage; and suitably determining the fuel cell stop mode if the voltage of the storage means is above the reference voltage corresponding to a low power region or a regenerative braking region and if the current state is not a fuel cell warning state, where the fuel cell warning state corresponds to deterioration of the fuel cell stack.

In another preferred embodiment, the step of performing the fuel cell stop mode preferably comprises: suitably cutting off the air supply to the fuel cell stack; and allowing the current output from the fuel cell to be cut off as a current generated by residual oxygen in a cathode is consumed.

In still another preferred embodiment, the method further comprises: preferably entering a non-power generation mode, if the current output from the fuel cell stack is cut off, such that the pressure of an anode is suitably maintained at a predetermined pressure for preventing oxygen from being suitably introduced into the anode by supplying hydrogen to the fuel cell stack; and preferably driving a load device for voltage elimination to suitably prevent voltage from being generated in the fuel cell stack, if the voltage of the fuel cell stack drops to be eliminated, and cutting of the hydrogen supply.

In yet another preferred embodiment, the method further comprises: immediately driving the load device for voltage elimination, if the voltage does not drop, but is present, when a predetermined time has elapsed after the non-power generation mode is started in a state where the pressure of the anode is maintained at the predetermined pressure; and cutting off the hydrogen supply, if residual voltage is eliminated from the fuel cell stack.

In still yet another preferred embodiment, the method further comprises: determining whether acceleration is expected after the non-power generation mode is started; and continuously maintaining the hydrogen supply, if the acceleration is expected.

In a further preferred embodiment, the step of performing the fuel cell stop mode comprises: suitably cutting off the hydrogen supply to the fuel cell stack; and allowing the current output from the fuel cell to be cut off by cutting off the air supply to the fuel cell stack if the pressure of the anode is reduced to the predetermined pressure as a current generated by residual hydrogen in the anode is suitably consumed.

In another further preferred embodiment, in the step of performing the fuel cell restart mode, if the conditions for restarting the fuel cell are satisfied, in which the voltage of the storage means is below the predetermined reference voltage or a load required by the vehicle is above a reference load, the fuel cell restart mode is entered by restarting the air and hydrogen supply.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
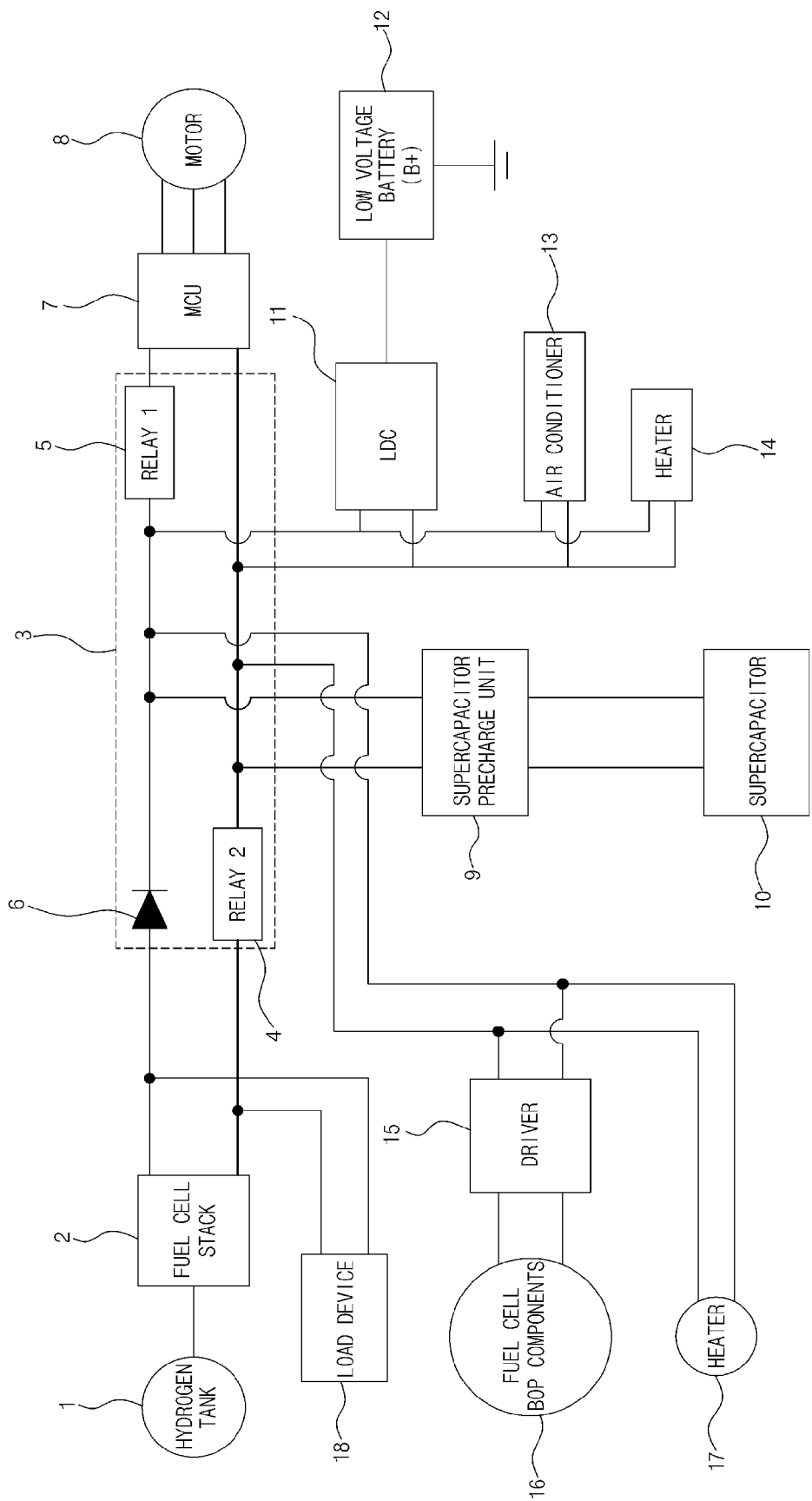
FIG. 1 is an exemplary configuration diagram showing a power system of a fuel cell-supercapacitor hybrid vehicle
Figure 2:
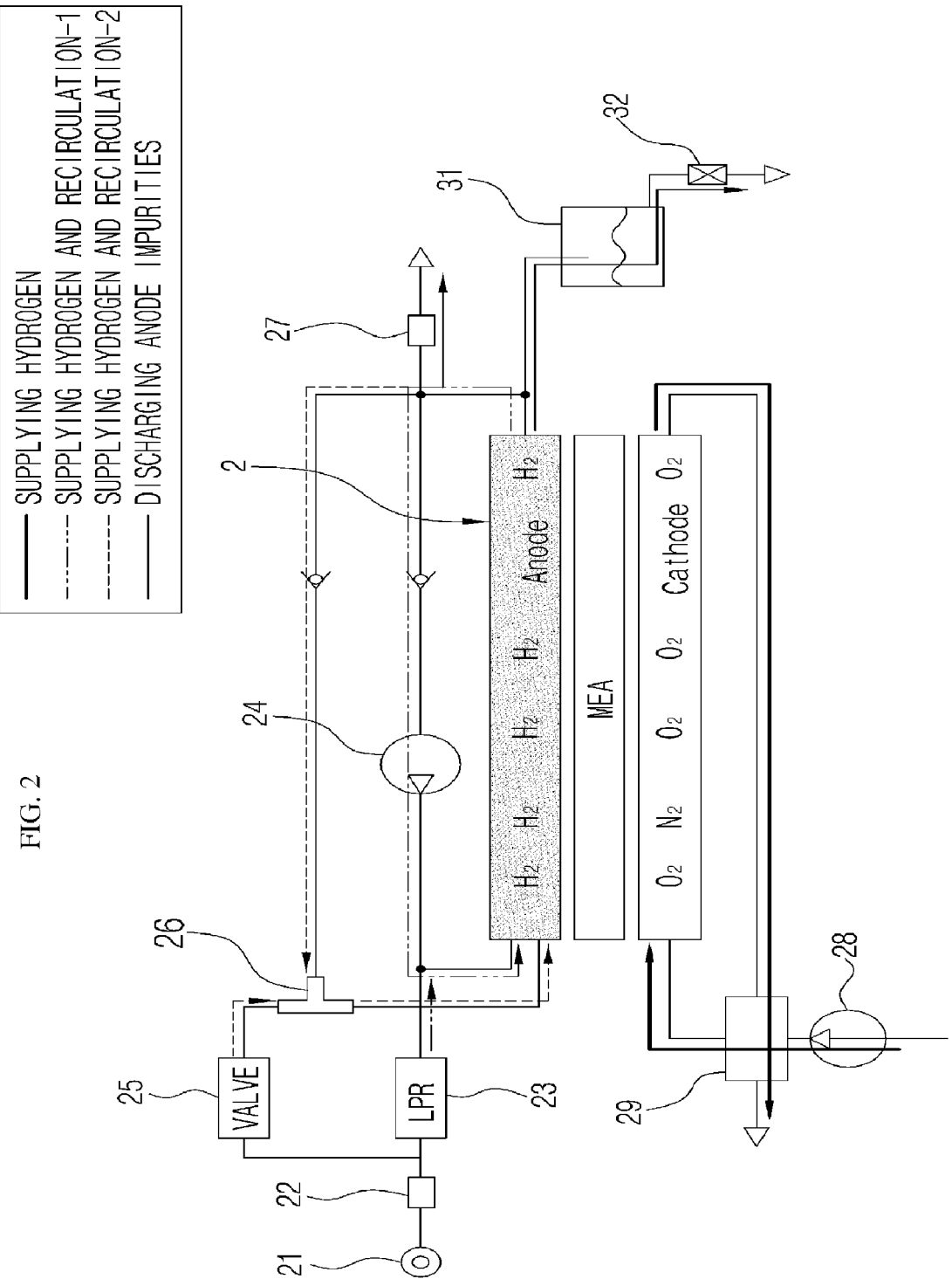
FIG. 2 is a configuration diagram showing an air supplier and a hydrogen supplier in a fuel cell vehicle.

Reference numerals set forth in the Drawings includes reference to the following elements as further discussed below:

| | |
|---|---|
| 2: fuel cell stack | 8: motor |
| 10: supercapacitor | 16: fuel cell BOP components |
| 18: load device for voltage elimination | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an idle stop-start control method of a fuel cell hybrid vehicle including a fuel cell as a main power source and a storage means as an auxiliary power source, the method comprising determining whether to perform a fuel cell stop mode, performing the fuel cell stop mode, if the fuel cell stop mode is determined; and performing a fuel cell restart mode, if conditions for restarting the fuel cell are satisfied in the fuel cell stop mode.

In one embodiment, the method further comprises a step where determining whether to perform a fuel cell stop mode further comprises determining conditions for stopping power generation of the fuel cell.

In another embodiment of the method, performing the fuel cell stop mode further comprises cutting off the current output from a fuel cell stack by stopping the supply of reactant gases to the fuel cell, if the fuel cell stop mode is determined.

In a further embodiment of the method, the step of performing a fuel cell restart mode further comprises by restarting the supply of air and hydrogen, if conditions for restarting the fuel cell are satisfied in the fuel cell stop mode.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

As described above, the fuel cell-storage means (e.g., supercapacitor) hybrid system that does not employ a power converter has high fuel efficiency (e.g. high regenerative braking, high efficiency of the supercapacitor), an increase in durability of the fuel cell, high reliability control (e.g. automatic power assist, automatic regenerative braking function), and the like, but there is a limitation in the regenerative braking due to an increase in voltage of the storage means since the supercapacitor is automatically charged by the fuel cell. For example, when the supercapacitor, which is a storage means, is automatically charged by the fuel cell, the amount of electrical energy charged in the supercapacitor is suitably increased, and thus the amount of electrical energy charged by the regenerative braking is reduced. Such a problem can be addressed by stopping the operation of the fuel cell during low power operation and during regenerative braking. In particular, it is possible to improve the fuel efficiency by stopping the power generation of the fuel cell during low power operation where the efficiency is low.

Accordingly, in the present invention, the fuel cell on/off is preferably controlled by controlling the supply of reactant gases in a fuel cell-storage means hybrid system, in which the power generation of the fuel cell is stopped by cutting off the supply of reactant gases during low power operation such that the power required for driving the vehicle is preferably supplied from the storage means, e.g., a supercapacitor or a battery, to drive the vehicle in an electric vehicle (EV) mode, and the operation of the fuel cell is also stopped during regenerative braking, thus suitably improving the fuel efficiency. It is possible to improve the efficiency of the fuel cell system by appropriately cutting off the air supply (which requires operation of an air blower) and the hydrogen supply during low power operation and during regenerative braking.

In order to improve the fuel efficiency in the fuel cell hybrid vehicle, it is necessary to improve the efficiency of the respective components; however, it is also important to develop an optimal technique for driving the vehicle. Considerable factors for improving the fuel efficiency include, but are not limited to, a reduction in the operation of fuel cell balance-of-plant (BOP) components, an increase in the amount of regenerative braking, and an increase in the efficiency of hydrogen use, which can be achieved by stopping the power generation of the fuel cell during low power operation and during regenerative braking. Preferably, the output of the fuel cell BOP components such as an air blower, a hydrogen recirculation blower, a water pump, etc., is suitably greater than that required for driving the system during low power operation, and thus the efficiency of the fuel cell system is suitably decreased. Accordingly, if the use of the fuel cell BOP components is appropriately stopped without any device for stopping the operation of the fuel cell, it is possible to improve the efficiency of the fuel cell system and prevent the storage means from being automatically charged by the fuel cell, which is a drawback of the fuel cell-storage means hybrid vehicle system, thus preventing a reduction in the amount of regenerative braking.

In an exemplary embodiment, a detailed description of the present invention will be provided with an example of a fuel cell-supercapacitor hybrid vehicle. However, it will be readily understood by those skilled in the art that the supercapacitor may be suitably substituted by a high voltage battery, which is another auxiliary power source. It is well known in the art that the supercapacitor and the battery are the storage means capable of being charged and discharged and used as the auxiliary power sources of the fuel cell hybrid vehicle.

Preferably, a fuel cell system controller may perform the idle stop-start of the present invention, and the control process of the present invention may be suitably executed by cooperative control between several controllers including a power distribution controller, which is a superior controller in the fuel cell hybrid system, under the control of the fuel cell system controller.

Figure 3:
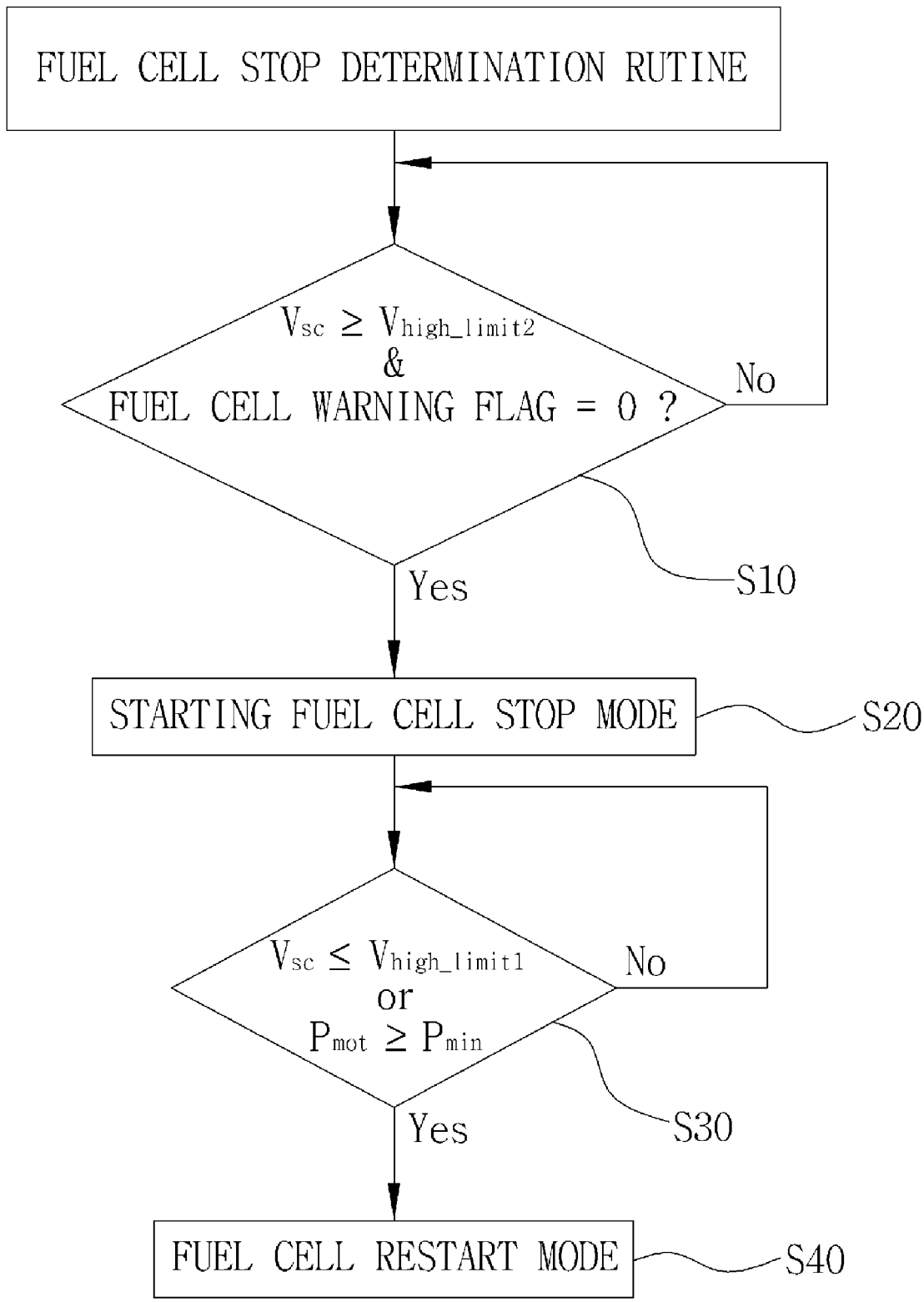
FIG. 3 is a flowchart showing a fuel cell on/off control process in accordance with exemplary embodiments of the present invention.
Figure 4:
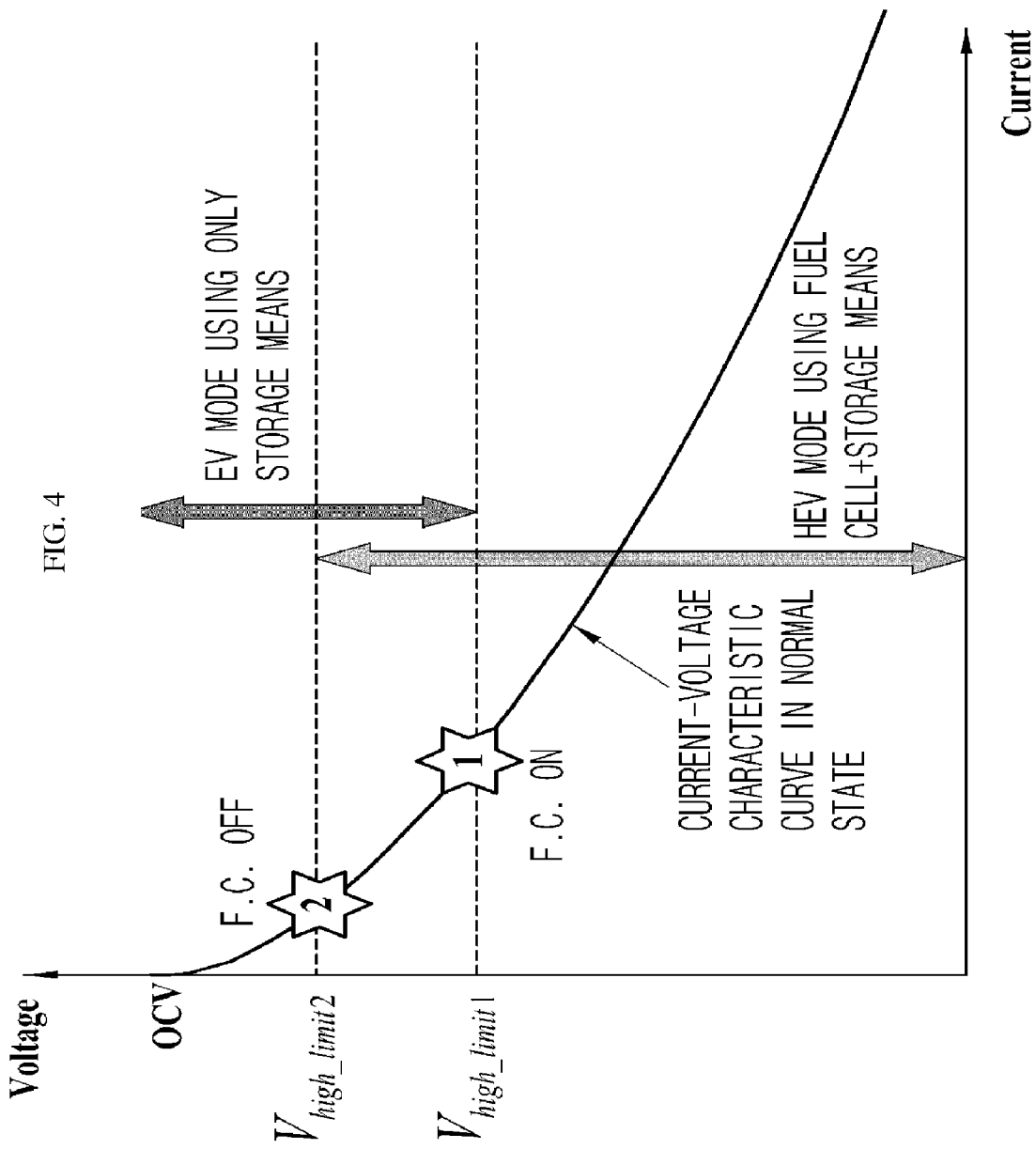
FIG. 4 is a graph showing a fuel cell on/off control method in accordance with preferred embodiments of the present invention.

FIG. 3 is a flowchart showing a fuel cell on/off control process in accordance with exemplary embodiments of the present invention, and FIG. 4 is a graph showing a fuel cell on/off control method in accordance with preferred embodiments of the present invention.

According to preferred embodiments, first, a step of determining whether the idle stop is performed, i.e., whether the power generation of the fuel cell is stopped, is suitably performed (S10). Since the voltage of the supercapacitor is in inverse proportion to the load of the fuel cell in the fuel cell-supercapacitor hybrid system, it is possible to determine whether the power generation of the fuel cell is stopped or restarted, i.e., whether the fuel cell is turned on or off, based on the supercapacitor voltage.

Accordingly, in further embodiments, the supercapacitor voltage is compared with a predetermined first reference voltage (expressed as "$V_{high\_limit2}$" in the figures) and, if the supercapacitor voltage (corresponding to a main bus terminal voltage measured at the main bus terminal by a voltage sensor) is above the first reference voltage, corresponding to a low power region or a regenerative braking region, and if the current state is not a fuel cell warning state (Fuel Cell Warning Flag=0) corresponding to deterioration of the fuel cell stack, the fuel cell stop is determined, thus performing a fuel cell stop mode (S20) as described below.

Preferably, in the fuel cell stop state, it is suitably monitored whether the conditions for releasing the idle stop, i.e., the conditions for restarting the fuel cell, are satisfied (S30). In preferred embodiments, the supercapacitor voltage is compared with a predetermined second voltage (expressed as "$V_{high\_limit1}$" in the figures) and, if the supercapacitor voltage (in inverse proportion to the load of the fuel cell) is below the second reference voltage or if a load required by the vehicle is above a reference load, the fuel cell restart is determined, thus performing a fuel cell restart mode (S40) as described below.

Preferably, the first reference voltage is a supercapacitor voltage for determining the low power region of the fuel cell stack or the regenerative braking region, and thus the low power region of the fuel cell stack or the regenerative braking region can be determined based on the supercapacitor voltage (in inverse proportion to the load of the fuel cell).

Preferably, as shown in FIG. 4, the fuel cell is prevented from being frequently turned on and off by providing hysteresis at a point of time when the fuel cell is turned on and off, and the fuel cell is prohibited from being turned off in the fuel cell warning state, i.e., in an abnormal state such as deterioration of the fuel cell stack. Preferably, when it is determined that the fuel cell off state is suitably returned to the fuel cell on state, if the load required by the vehicle (e.g. a motor current, a vehicle request torque, an opening degree of an accelerator, etc.) is suitably above a predetermined value, the fuel cell is restarted regardless of the supercapacitor voltage. Preferably, during regenerative braking, it is possible to rapidly stop the operation of the fuel cell preferably by setting a reference voltage for determining the regenerative braking to be low, thus increasing the amount of regenerative braking. Preferably, in the fuel cell stop mode, the operation of the fuel cell BOP components such as, but not limited to, a hydrogen recirculation system, a cooling fan, and a cooling pump as well as an air blower is suitably stopped to save energy. The above set value corresponds to a suitable load required by the vehicle and accordingly is a predetermined reference value for determining whether to return to the fuel cell restart mode from the fuel cell stop mode.

Further embodiments of the invention feature a control process of the fuel cell stop mode, described herein.

Figure 5:
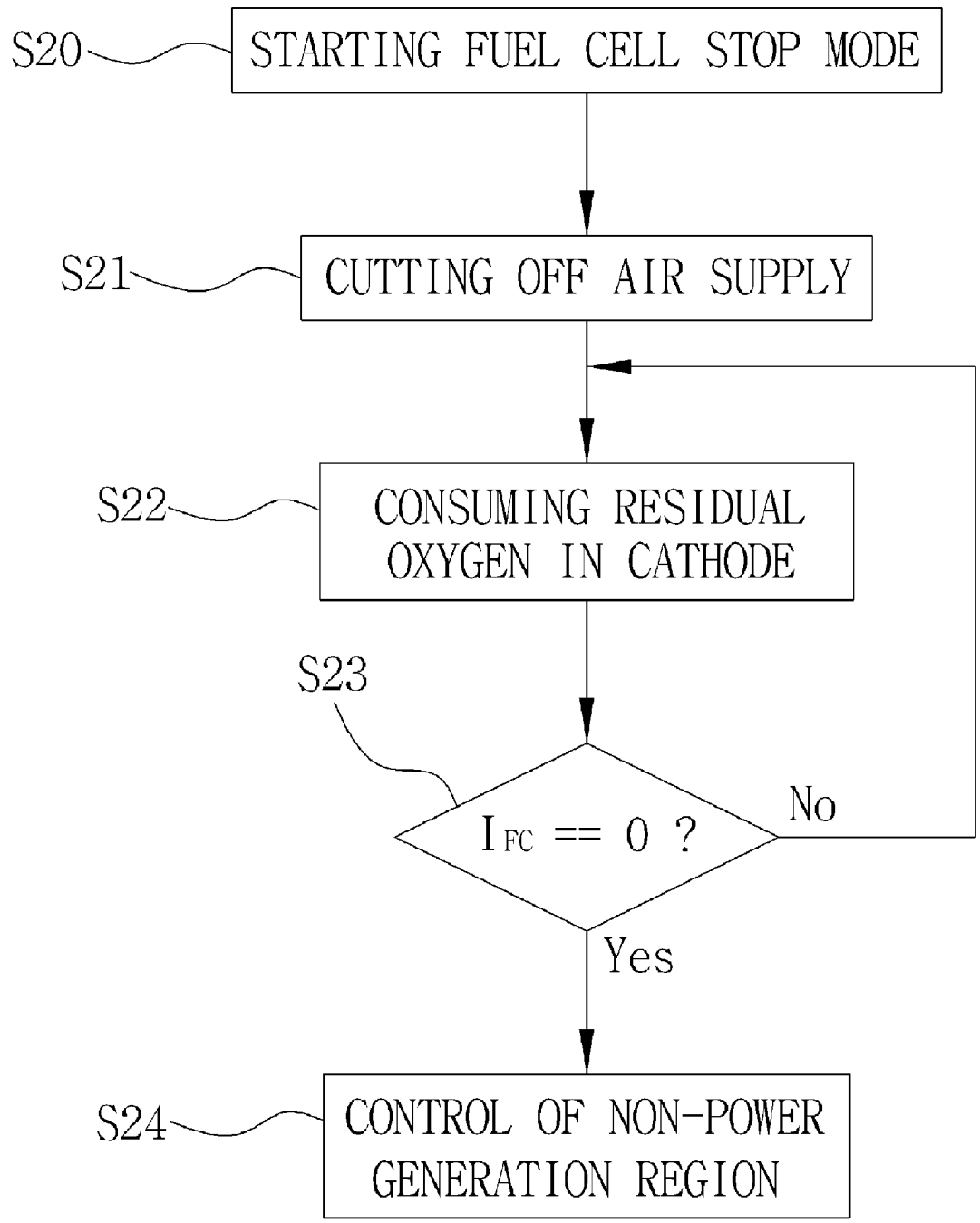
FIG. 5 is a flowchart showing an exemplary control process of a fuel cell stop mode in accordance with a preferred embodiment of the present invention.
Figure 6:
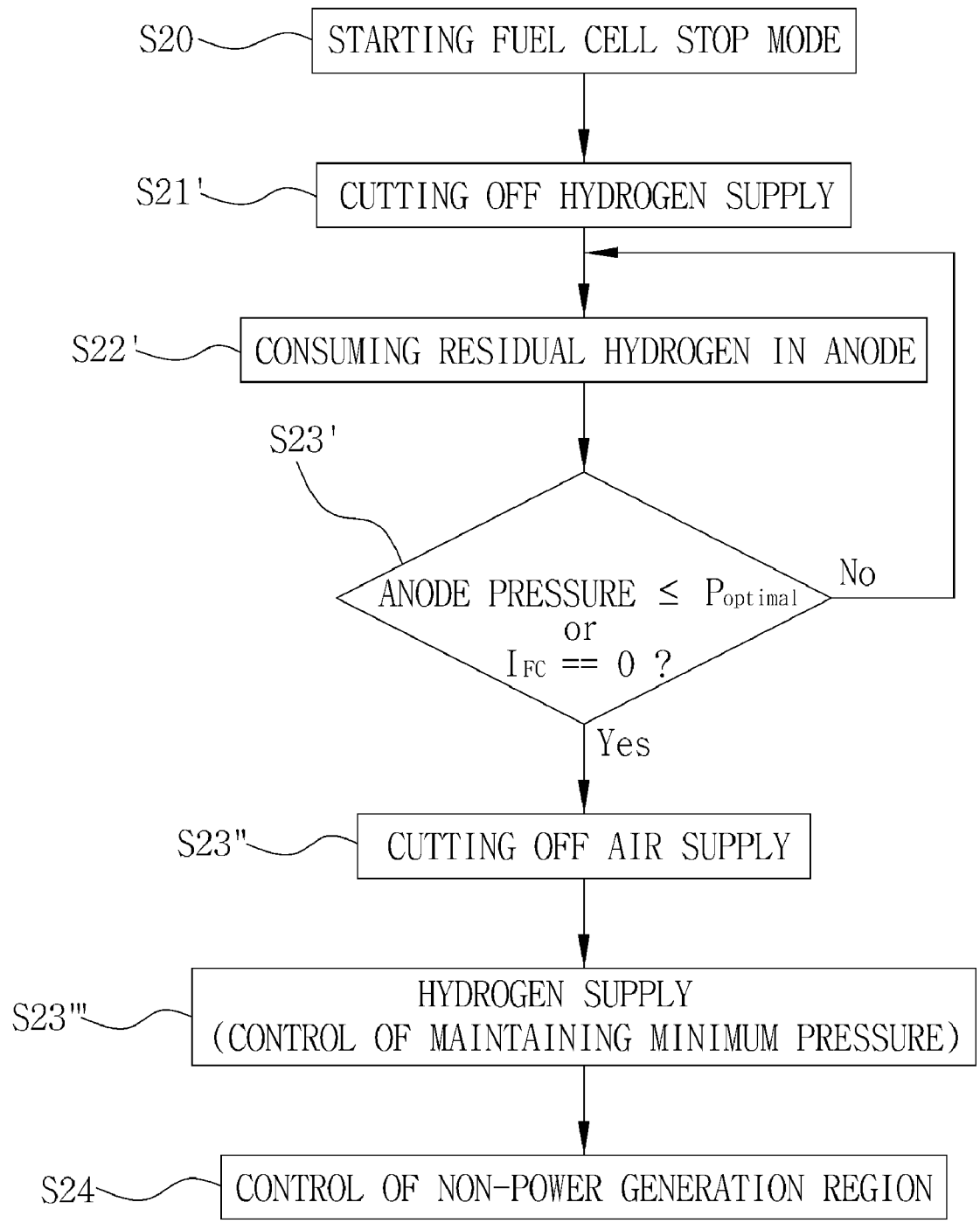
FIG. 6 is a flowchart showing an exemplary control process of the fuel cell stop mode in accordance with another preferred embodiment of the present invention.
Figure 7:
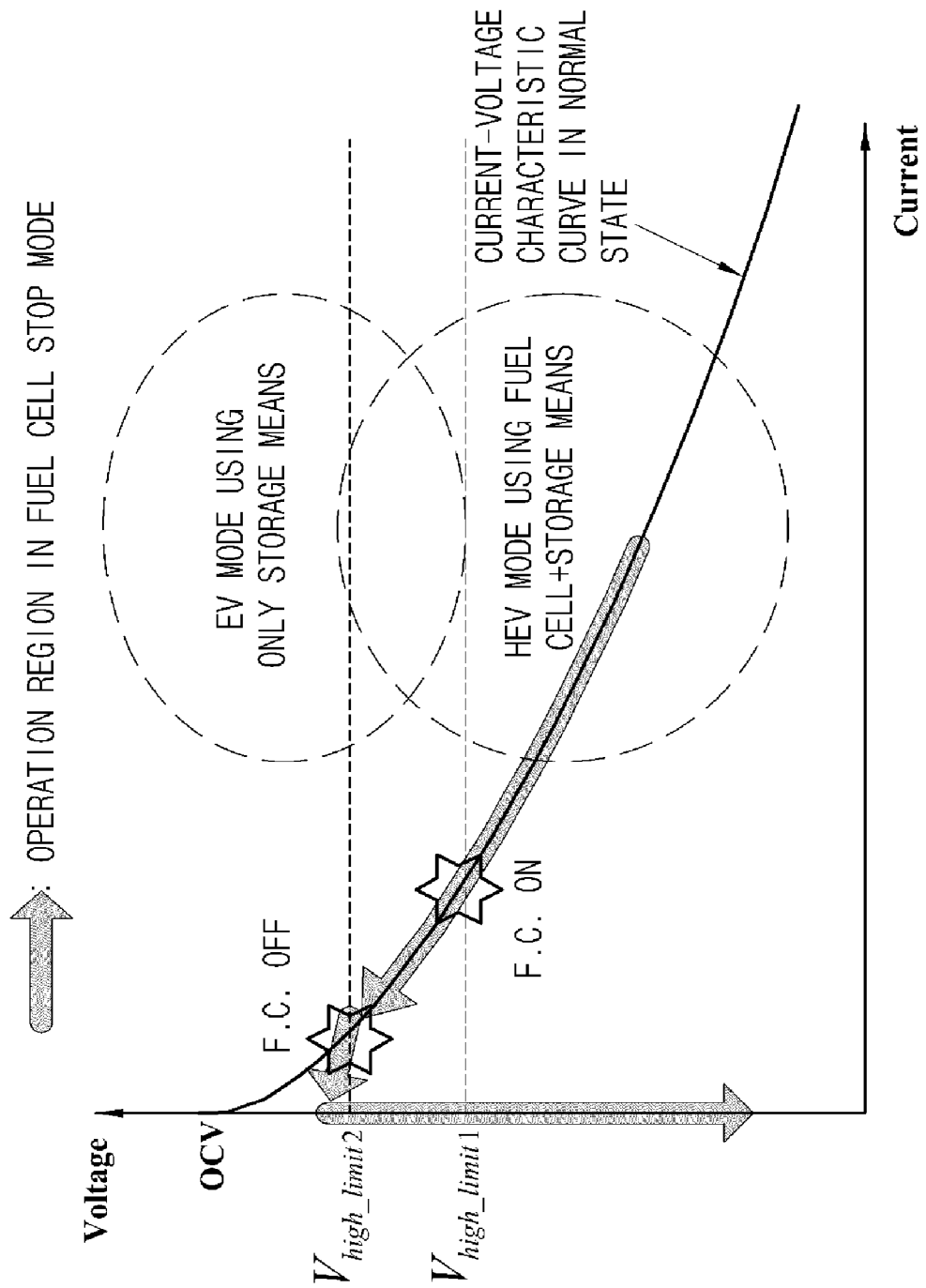
FIG. 7 is a graph showing an exemplary control method of the fuel cell stop mode in accordance with the present invention.

FIG. 5 is a flowchart showing an exemplary control process of the fuel cell stop mode in accordance with a preferred embodiment of the present invention, FIG. 6 is a flowchart showing an exemplary control process of the fuel cell stop mode in accordance with another preferred embodiment of the present invention, and FIG. 7 is a graph showing an exemplary control method of the fuel cell stop mode in accordance with the present invention.

For example, as shown in the figures, if the conditions for entering the fuel cell stop mode are preferably satisfied during normal operation, a control process of the fuel cell stop mode is started (S20). In a preferred embodiment of FIG. 5, when the fuel cell stop mode is preferably entered, the operation of the air blower is first stopped to cut off the supply of air (S21), one of the reactant gases, and the operation of the fuel cell is suitably stopped while cutting off the current output from the fuel cell stack ("F.C. OFF" in FIG. 7).

As above, when the fuel cell stop mode is preferably entered, if the operation of the air blower is stopped such that air is no longer supplied to the cathode of the fuel cell stack, the current flow is not immediately removed from the fuel cell stack. That is, the current generated by residual oxygen of the cathode is consumed to charge the supercapacitor and consumed by the BOP components and the vehicle loads (S22) and, if the fuel cell stack voltage is suitably lower than the supercapacitor voltage due to the consumed oxygen, the current no longer flows in the fuel cell stack (S23). Accordingly, a control for a non-power generation region is performed in a state where the output of the fuel cell is cut off (S24). In order to prevent the fuel cell from being deteriorated in the non-power generation region, it is preferably determined whether to operate the fuel cell BOP components other than the air blower, and thus the fuel cell voltage is nearly zero.

In the exemplary embodiment of FIG. 6, when the fuel cell stop mode is preferably entered (S20), the hydrogen supply is first cut off (for example, preferably by closing a hydrogen valve) (S21'), and the current generated by residual hydrogen of the anode is consumed to charge the supercapacitor and consumed by the BOP components and the vehicle loads (S22'). Preferably, if the pressure of the anode is reduced to a predetermined pressure $P_{optimal}$ at an optimal level (S23'), the air supply is cut off (for example, preferably by turning off the air blower) to prevent the voltage from further rising, thus preventing the current from flowing from the fuel cell stack (S23"). In preferred embodiments, the pressure $P_{optimal}$ is an anode pressure value predetermined to suitably reduce the amount of hydrogen crossover during the fuel cell stop mode. Thereafter, a step (S23'") of supplying hydrogen with a minimum pressure to prevent oxygen from being introduced is followed.

The minimum pressure of the step S23'" should be sufficient to prevent oxygen from being introduced while suppressing the hydrogen crossover as possible. In order to perform such a step, ON/OFF control of a hydrogen valve, PWM control, or linear pressure control may be accompanied. According to preferred embodiments of the invention, the control for the non-power generation region is preferably performed in a state where the output of the fuel cell is cut off (S24). In preferred embodiments, in order to prevent the fuel cell from being deteriorated in the non-power generation region, it is suitably determined whether to operate the fuel cell BOP components other than the air blower, and accordingly in further embodiments the fuel cell voltage is nearly zero.

According to the invention described herein when the above-described fuel cell stop mode is performed, the power required to drive the vehicle at low power region is preferably supplied from the supercapacitor such that the vehicle is driven in the EV mode and, as a result, the operation of the fuel cell and its BOP components is stopped at low power region, thus improving the fuel efficiency. If during regenerative braking, the operation of the fuel cell is suitably stopped such that the supercapacitor is not automatically charged by the fuel cell, the amount of regenerative braking is thus increased.

Figure 8:
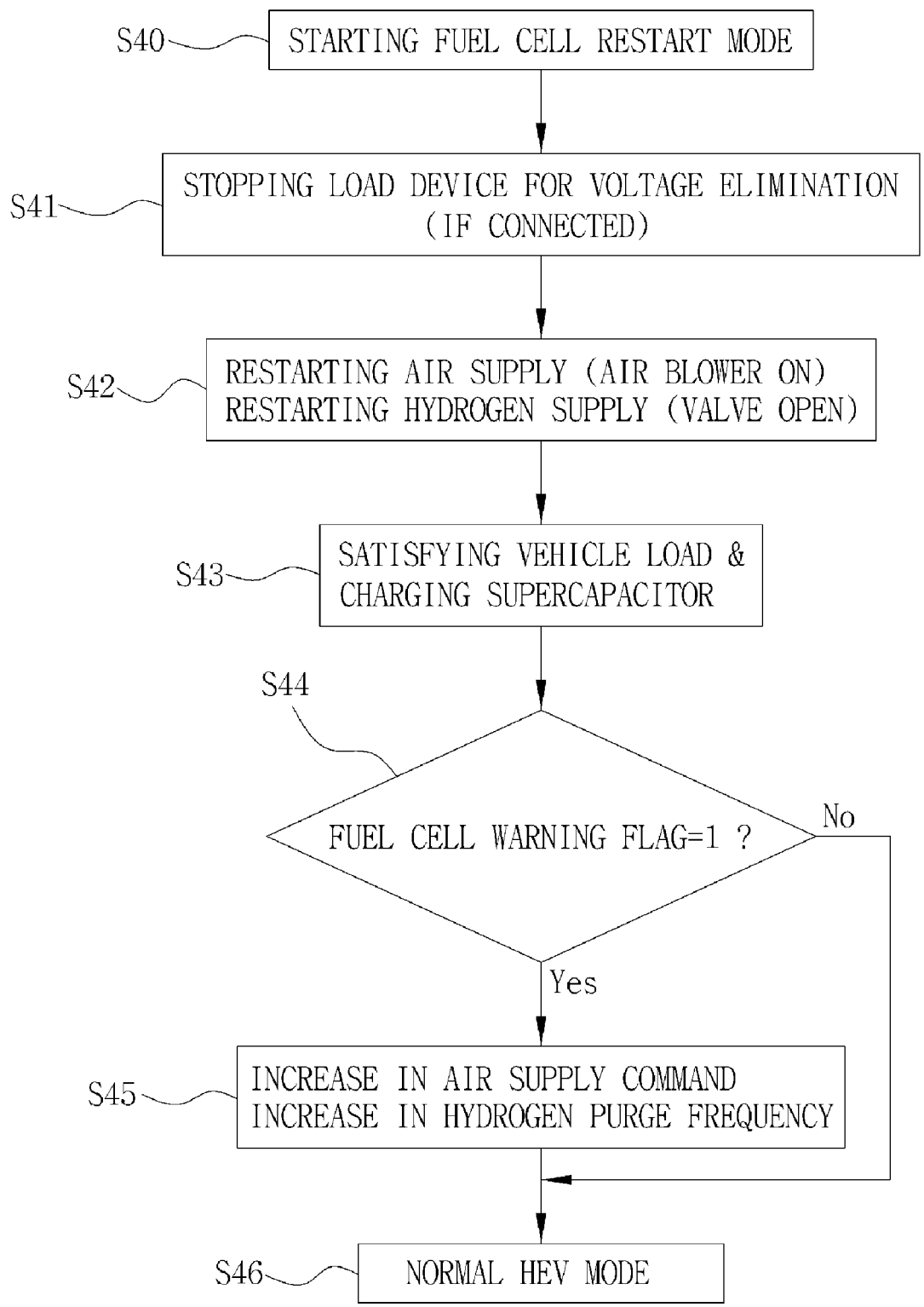
FIG. 8 is a flowchart showing an exemplary control process of a fuel cell restart mode in accordance with certain exemplary embodiments of the present invention.
Figure 9:
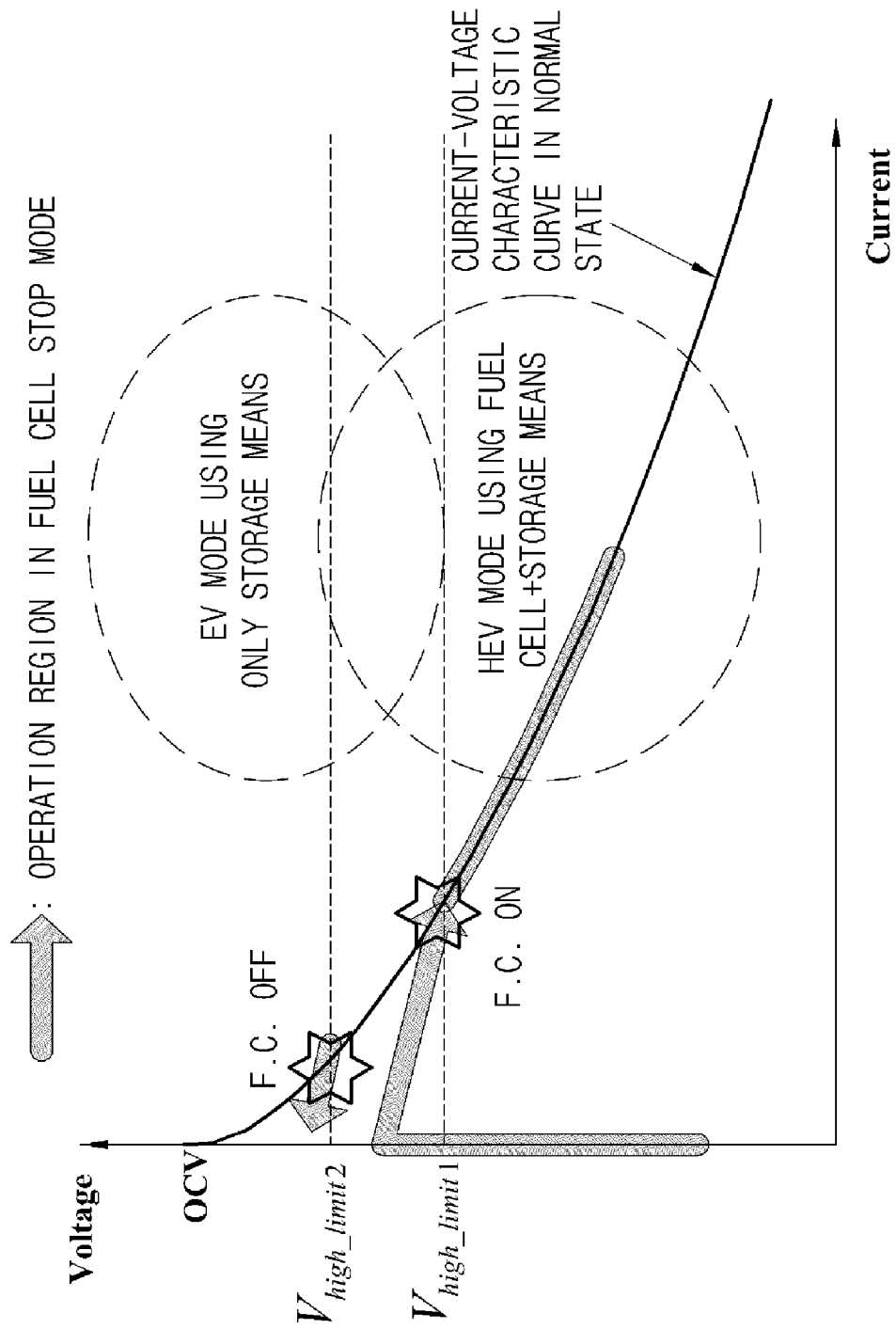
FIG. 9 is a graph showing a control method of the fuel cell restart mode in accordance with preferred embodiments of the present invention.

FIG. 8 is a flowchart showing an exemplary control process of the fuel cell restart mode in accordance with certain preferred embodiments of the present invention, and FIG. 9 is a graph showing a control method of the fuel cell restart mode in accordance with preferred embodiments of the present invention.

Preferably, when the fuel cell restart mode is suitably entered (S40), the operation of a load device for voltage elimination (18 of FIG. 1) is first stopped (S41), the hydrogen and air supply is restarted (preferably by opening the hydrogen valve and turning on the air blower) to increase the fuel cell voltage (S42), and a current corresponding to the vehicle load and the supercapacitor charging current is suitably output from the fuel cell stack (S43). Accordingly, in further preferred embodiments, the operation of the fuel cell BOP components such as, but not only limited to, the air blower, the hydrogen recirculation blower, the water pump, etc. is suitably restarted to satisfy the vehicle load. Further, since the current is drawn at the substantially the same time with the fuel cell start-up, an abnormal state of the fuel cell, for example deterioration of the fuel cell stack, is checked (S44) and, if an abnormal state of the fuel cell is a warning state, the amount of air supply is increased or the hydrogen purge cycle is shortened (or a hydrogen purge valve is opened for a long period of time during purging) (S45). As a result, the generation of electrical energy of the fuel cell stack is more rapidly performed, thus maintaining the performance of the fuel cell stack. In preferred embodiments, the abnormal state of the fuel cell system such as deterioration of the fuel cell stack is suitably determined by measuring, for example, a fuel cell stack temperature, a voltage variation between cells, a fuel cell stack total voltage, etc.

As above, as the fuel cell restart mode is performed, the hydrogen and air supply is restarted such that the fuel cell restart is completed ("F.C. ON" in FIG. 9), and thereby the vehicle is driven in a hybrid electric vehicle (HEV) mode in which the power of the fuel cell and the power of the supercapacitor are substantially simultaneously used (S46).

Figure 10:
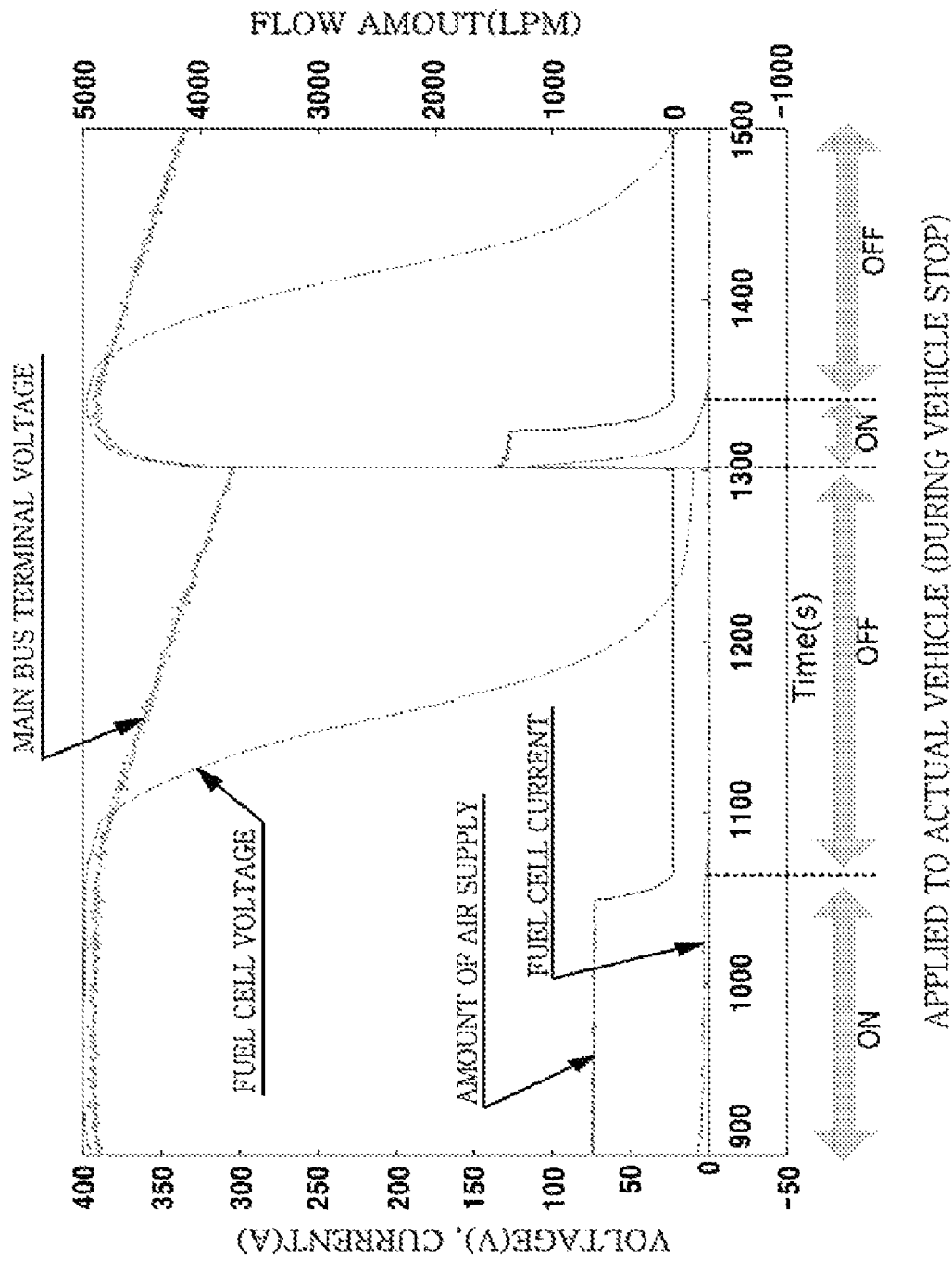
FIG. 10 is a diagram showing results obtained by applying the control method of exemplary embodiments of the present invention to an actual vehicle.

As exemplified in preferred embodiments, the present inventor performed a test in which the air supply was suitably stopped and restarted repeatedly in a preferred state where the actual vehicle, to which the control method of the present invention is directly applied, is stopped, and the results are shown in FIG. 10. As shown in the figure, the air supply was suitably stopped and restarted repeatedly preferably according to the main bus terminal voltage (supercapacitor voltage) and it could be seen that the voltage was suitably reduced when the air supply is stopped. During restart, the voltage was rapidly recovered by supplying an appropriate amount of air.

Figure 11:
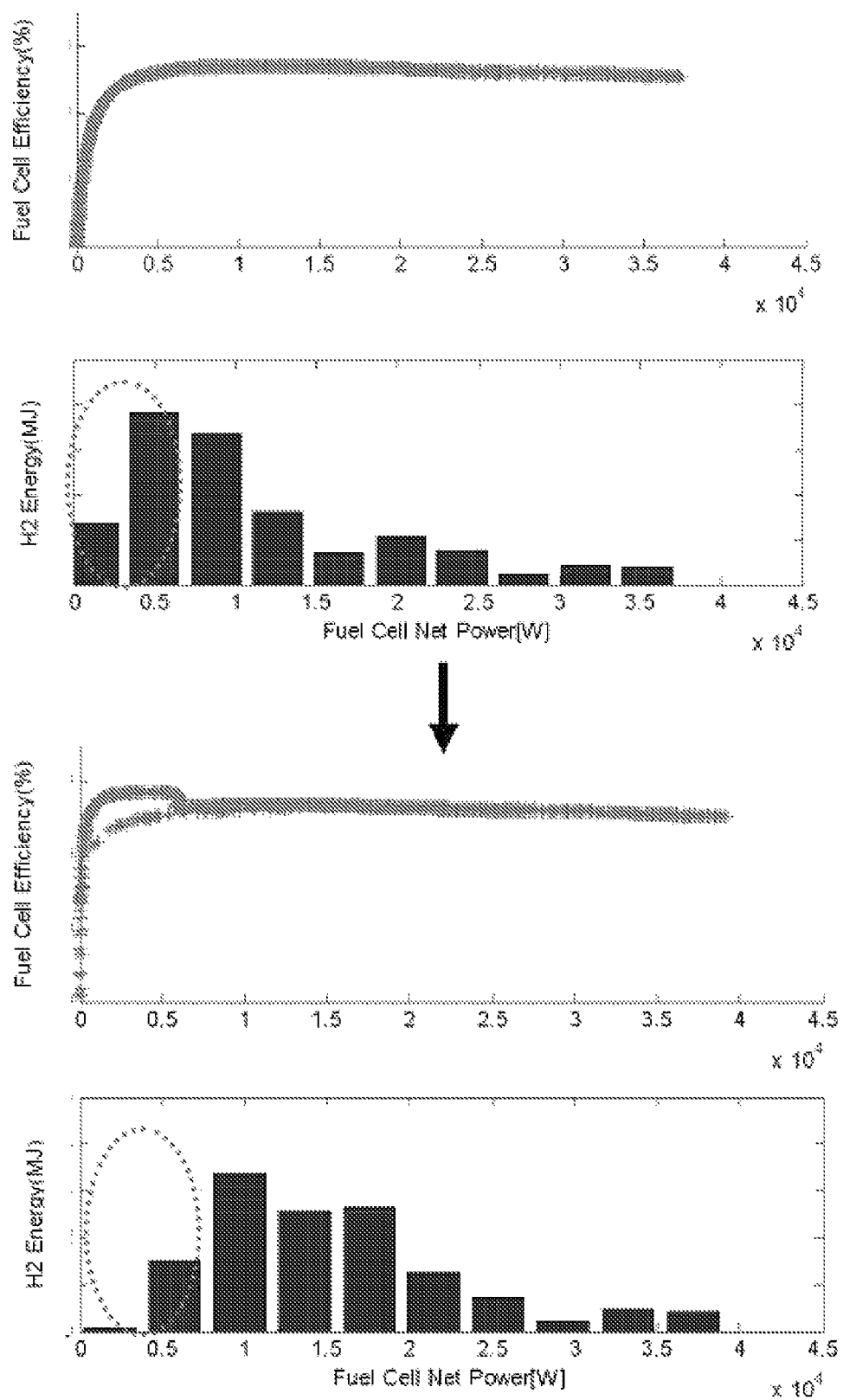
FIGS. 11 and 12 demonstrate exemplary embodiments of the invention wherein the efficiency of the fuel cell system is improved and the energy use distribution is improved when the present invention is performed.
Figure 12:
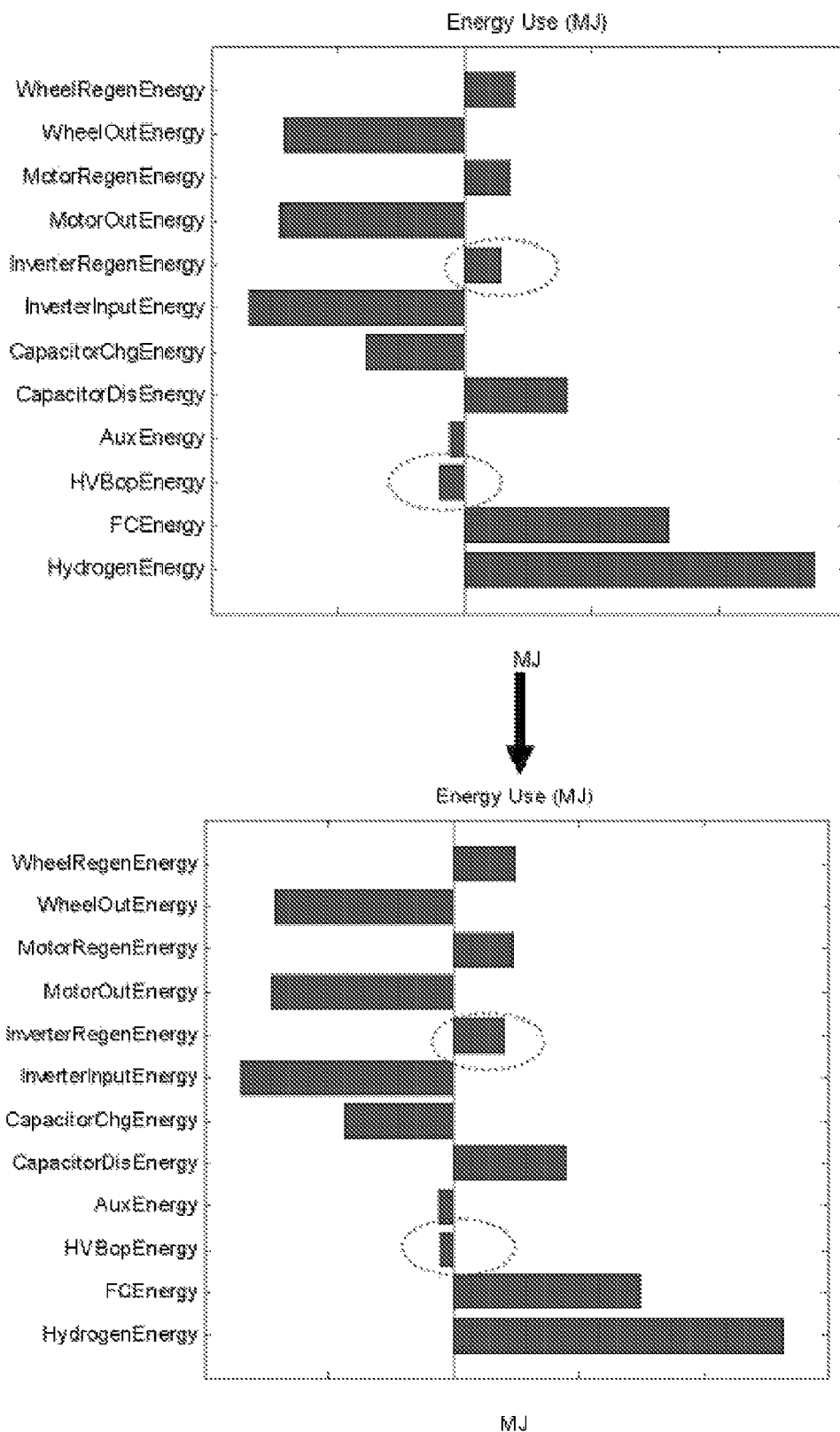

FIGS. 11 and 12 demonstrate exemplary embodiments of the invention wherein the efficiency of the fuel cell system is improved and the energy use distribution is improved when the present invention is performed. Preferably, according to preferred embodiments of the invention described herein, the fuel cell is operated in the high efficiency region since the operation of the fuel cell BOP components is suitably stopped at low power region where the efficiency is low. Preferably, the high efficiency operation of the fuel cell results from a suitable reduction in energy of the fuel cell BOP components, and further it is possible to obtain a sufficient amount of regenerative braking since the current charged from the fuel cell to the supercapacitor is cut off. Preferably, when the present invention is applied, for example, a 4% to 5% improvement in fuel efficiency may preferably be expected, and such an improvement in fuel efficiency results from a reduction in energy consumption by the fuel cell BOP components (refer to dotted lines in FIG. 12) and an increase in regenerative braking energy recovery (refer to dotted lines in FIG. 12). In FIG. 11, "Fuel Cell Net Power" represents an exemplary output obtained by subtracting an output, required in the fuel cell BOP components, from an output of the fuel cell, and denotes an output applied from the fuel cell to the vehicle load.

In further preferred embodiments, the present invention includes a suitable control method capable of preventing the fuel cell stack from being deteriorated in the non-power generation region without a loss of improvement in fuel efficiency (according to the idle stop control) as a suitable control strategy for maintaining the fuel cell at an optimal state when the fuel cell stop mode is started to embody the idle stop.

In a preferred example, a control process of the non-power generation region of the present invention will be described with reference to exemplary FIG. 13 below. The control process of the non-power generation region of FIG. 13 follows the idle stop control process in accordance with the exemplary embodiment of FIG. 5.

Preferably, in the control process of the non-power generation region of the present invention, in a state where the air supply to the fuel cell stack is suitably stopped as the fuel cell stop mode is started, the fuel cell is maintained at an optimal state by determining whether residual voltage is present in the fuel cell, suitably controlling the anode pressure of the fuel cell stack, and suitably controlling the load device for preventing voltage generation in the fuel cell stack.

It is known to one of skill in the art that the deterioration of the fuel cell is promoted due to carbon corrosion if oxygen is supplied to the anode in a state where the fuel cell voltage $V_{FC}$ remains somewhat when the operation of the fuel cell is stopped. Accordingly, in preferred embodiments, it is necessary to prevent the oxygen from being supplied to the anode by maintaining the hydrogen supply, not by directly stopping the hydrogen supply to the anode.

Figure 14:
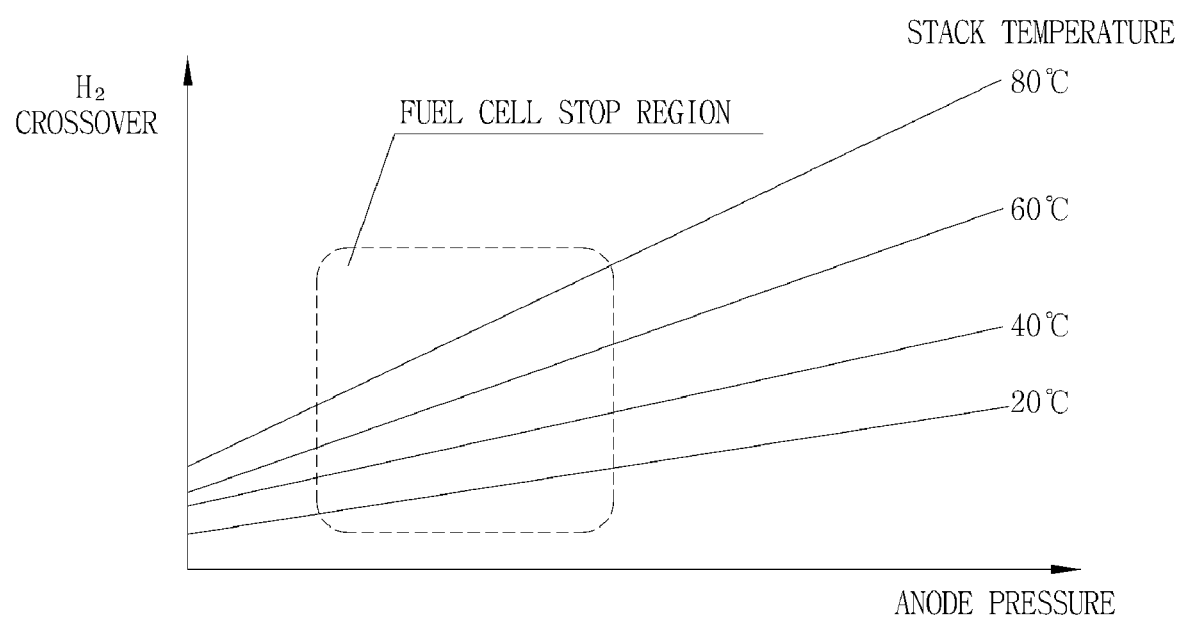
FIG. 14 is a diagram showing the amount of hydrogen crossover with respect to hydrogen pressure of an anode.

If the hydrogen supply is continuously maintained, residual hydrogen in the anode directly passes through an electrolyte membrane without generation of electricity and reacts with oxygen in the cathode, which is called the hydrogen crossover having a bad effect on the fuel efficiency. FIG. 14 shows the amount of hydrogen crossover with respect to hydrogen pressure of the anode. Accordingly, if the hydrogen pressure of the anode is maintained at an appropriate level, it is possible to suitably prevent hydrogen loss to the cathode (a loss due to the crossover) and prevent oxygen from being supplied to the anode, thus maintaining the durability of the fuel cell stack.

Taking the above circumstances into consideration, the present invention does not directly stop the hydrogen supply after the fuel cell non-power generation is started, but maintains the anode pressure at an optimal level by suitably supplying an appropriate amount of hydrogen and then stops the hydrogen supply if the fuel cell voltage is eliminated.

If the conditions for the fuel cell stop as shown in FIG. 4 are suitably satisfied during normal operation, the control process of the fuel cell stop mode (idle stop control) as shown in FIG. 5 is preferably performed. If the fuel cell stop mode is entered, the operation of the air blower is stopped to stop the air supply and, at this time, a portion of residual oxygen in the cathode is consumed to generate a current to be charged to the supercapacitor and consumed by the fuel cell BOP components. As a result, the fuel cell voltage $V_{FC}$ is lower than the supercapacitor voltage due to the consumed oxygen, and thus the current no longer flows in the fuel cell stack.

Figure 13:
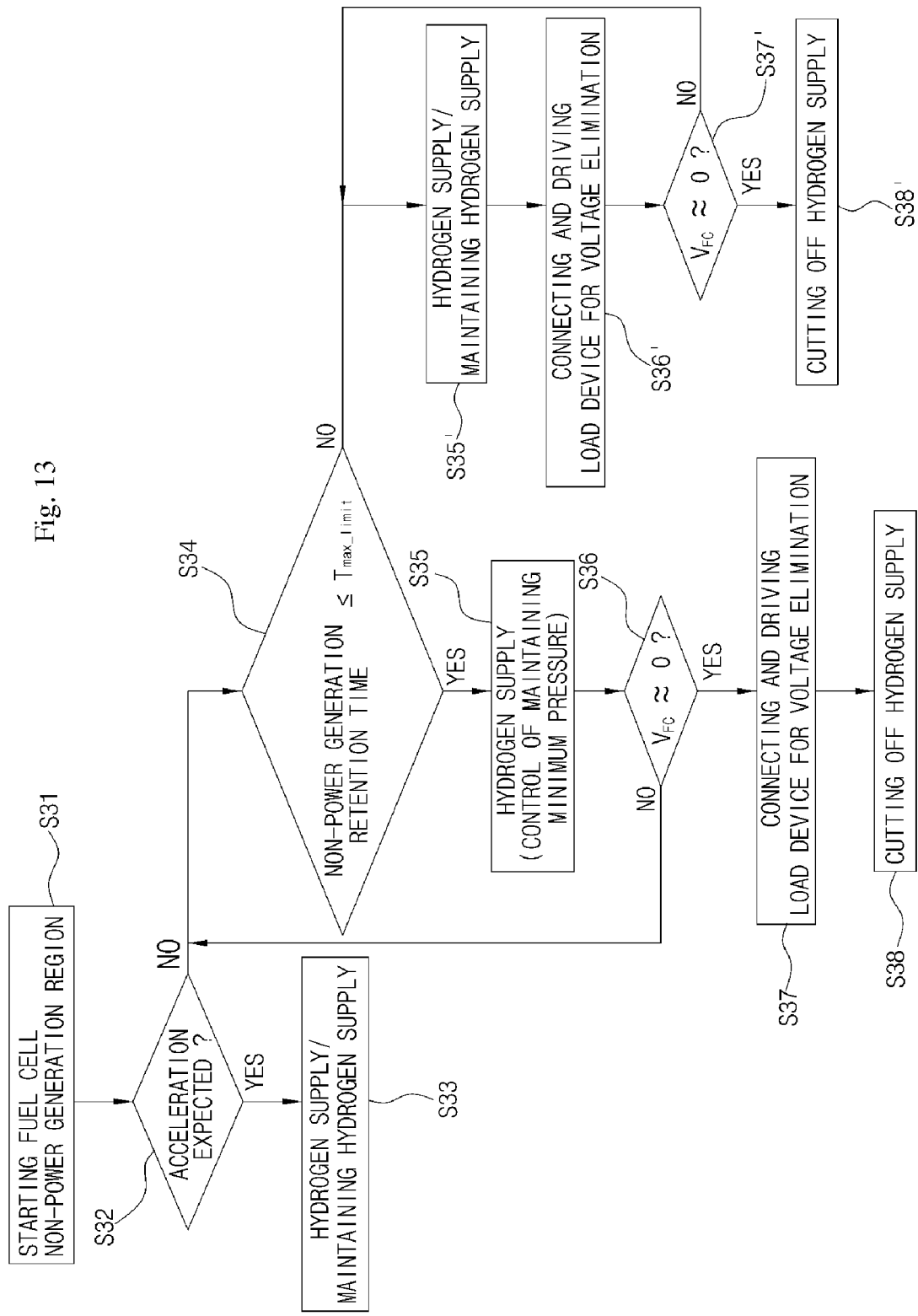
FIG. 13 is a flowchart showing a control method of a non-power generation region in accordance with the present invention.

In further embodiments, as shown in FIG. 13, the fuel cell enters the non-power generation mode (S31). Preferably, it is determined whether acceleration of the vehicle is expected and, if so, the hydrogen supply is maintained without the operation of the load device for voltage elimination (18 of FIG. 1) (S32 and S33). In case where the hydrogen has not been supplied (as seen from FIG. 6), the hydrogen supply is initiated at the step S33. At this time, an acceleration pedal sensor value, a brake pedal sensor value, a navigation signal, a transmission gear position, etc. can be used to determined whether the acceleration is expected. As above, if the acceleration is expected, the hydrogen supply to the anode is maintained to ensure the power performance in spite of a decrease in fuel efficiency due to the hydrogen crossover. Then, preferably, when the fuel cell is restarted, a hydrogen supply process can be eliminated and the power generation of the fuel cell may be immediately restarted.

In other preferred embodiments, if the acceleration is not expected, since some residual voltage remains within a predetermined time $T_{max\_limit}$ after the non-power generation mode is started, the pressure of the anode is maintained at a predetermined pressure $P_{optimal}$ by supplying hydrogen to the fuel cell stack (S34 and S35). Here, the pressure $P_{optimal}$ is set to a minimum hydrogen pressure of the anode to prevent oxygen from being supplied from the cathode. The minimum hydrogen pressure of the step S35 should be appreciated, which is sufficient to prevent oxygen from being introduced while suppressing the hydrogen crossover as possible. In order to perform such a step, ON/OFF control of a hydrogen valve, PWM control, or linear pressure control may be accompanied.

Then, if the voltage drops to zero (S36) as the amount of oxygen in the cathode is reduced (the air supply is stopped) since hydrogen in the anode directly reacts with oxygen in the cathode (crossover), the load device for voltage elimination is connected to the fuel cell stack and driven to prevent voltage generation (S37), and the hydrogen supply is cut off (S38). In this state, the load device for voltage elimination is driven to eliminate the voltage and prevent further voltage generation, even if the voltage is generated by an unexpected situation such as an external air supply.

Preferably, if the voltage does not drop when a predetermined time $T_{max\_limit}$ has elapsed after the non-power generation mode is started in a state where the pressure of the anode is maintained at the predetermined pressure through the hydrogen supply (non-power generation retention time>$T_{max\_limit}$ and $V_{FC}$>0), the load device for voltage elimination is immediately connected to the fuel cell stack and driven to eliminate residual voltage in the fuel cell stack, not waiting until the voltage drops (S34, S35' and S36'). Then, if the residual voltage is eliminated, the hydrogen supply is cut off (S37' and S38'). Here, the predetermined time $T_{max\_limit}$ is a value set to a maximum non-power generation time in which the load device for voltage elimination is not operated.

If the non-power generation retention time is increased, the residual voltage is substantially eliminated. Accordingly, the load device is immediately driven (if the load device is a resistor, a switch is connected), without need to control the hydrogen supply, and the control for preventing voltage generation is performed. Moreover, during high speed operation, if the fuel cell voltage does not drops due to an unexpected external air supply or if the current unexpectedly flows in the fuel cell stack due to an abnormal increase in the main bus terminal voltage, the load device for voltage elimination is immediately connected to reduce the voltage and then the hydrogen supply is cut off.

As described in the embodiments herein, in the present invention, the load device for voltage elimination (18 of FIG. 1) is preferably connected to an output port of the fuel cells stack to prevent voltage from being generated in the fuel cell stack during the fuel cell non-power generation region. The load device for voltage elimination may be a resistor connected and disconnected by a switching means or may be a combination of a power converter and a power storage device in order to provide an active control.

In certain embodiments, the invention features a resistor, where the resistor is preferably selectively connected and disconnected by a relay switch, which is suitably turned on and off by a controller, in the above control process. In further certain embodiments, the invention features a power converter, and preferably if a predetermined amount of voltage is generated, the power converter is controlled by a controller such that residual power is stored in the power storage device.

As described herein, in the control process of the non-power generation region, the method of maintaining the hydrogen supply as the acceleration is expected is suitably advantageous in terms of acceleration performance, and the method of cutting off the hydrogen supply after maintaining the anode pressure at an optimal level through the hydrogen supply is suitably disadvantageous in terms of acceleration performance. Accordingly, in terms of fuel efficiency, the method of maintaining the hydrogen supply as the acceleration is expected is suitably disadvantageous, and the method of immediately driving the load device for voltage elimination and cutting off the hydrogen supply without controlling the anode pressure is suitably advantageous.

Figure 15:
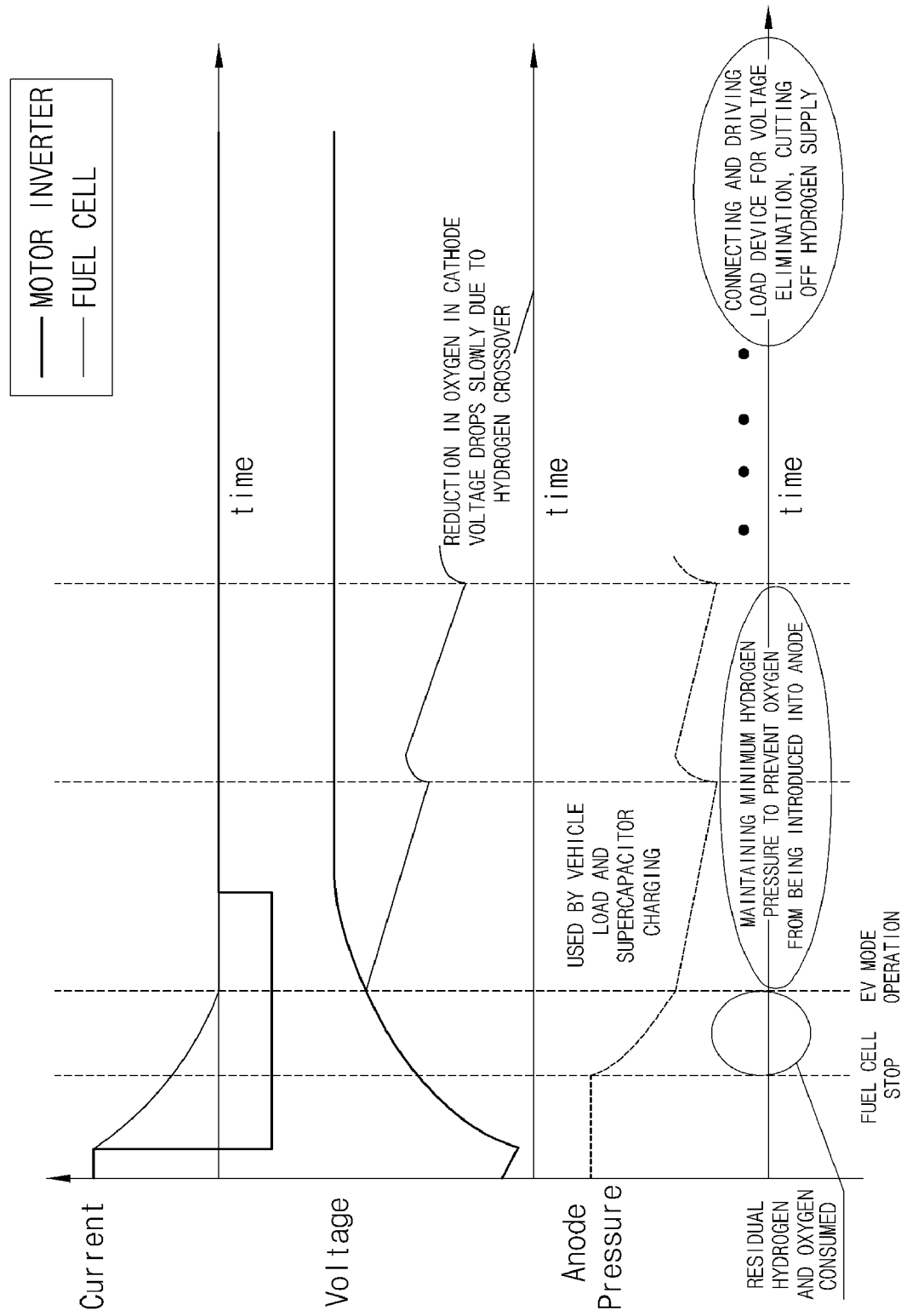
FIG. 15 is a diagram showing an example of the control method of the non-power generation in accordance with the present invention, in which a change in voltage with a change in pressure is shown.

FIG. 15 is a diagram showing an example of the preferred control method of the non-power generation region in accordance with the present invention, in which a change in voltage with a change in pressure, obtained when the method of maintaining the anode pressure at an optimal level through the hydrogen supply and cutting off the hydrogen supply is applied, is shown.

Preferably, as shown in the figure, after the air supply is cut off as the fuel cell stop mode is started, the current generated by residual hydrogen and oxygen is consumed by the vehicle load and consumed to charge the supercapacitor. As a result, if the current does not suitably flow in the fuel cell stack, the pressure in the anode is maintained at a minimum hydrogen pressure to prevent oxygen from being introduced. Then, if the fuel cell stack voltage drops due to a reduction in the amount of oxygen in the cathode, the load device for voltage elimination is connected to the fuel cell stack and driven, and the hydrogen supply is cut off.

In the above-described control method of the non-power generation region of the present invention, if the air supply to the fuel cell stack is suitably cut off as the fuel cell stop mode is started, the hydrogen supply is not immediately cut off. Instead, if the fuel cell voltage is preferably eliminated after maintaining the anode pressure at an optimal level by applying an appropriate amount of hydrogen, the hydrogen supply is cut off. As described herein, according to the control method of the non-power generation region, it is possible to prevent deterioration of the fuel cell stack, which occurs when oxygen is introduced into the anode through the electrolyte membrane, without a loss of improvement in fuel efficiency, and further improve the durability of the fuel cell stack.

As described above, according to the present invention, the air and hydrogen supply is suitably cut off in the low efficiency region of the fuel cell, and the fuel cell voltage drops by consuming residual oxygen and hydrogen, thus stopping the operation of the fuel cell (EV mode or regenerative braking mode). If the conditions for restarting the fuel cell are suitably satisfied, in which the voltage of the storage means (supercapacitor or battery) is below a predetermined reference voltage or the load required by the vehicle is above a reference load, the air and hydrogen supply is restarted to restart the fuel cell (HEV mode). As a result, the present invention has the following effects.

(1) Since the operation of the fuel cell BOP components (especially, the air blower) is preferably stopped during low power operation where the efficiency of the fuel cell is low, it is possible to suitably improve the fuel efficiency and the efficiency of the fuel cell system.

(2) Since the automatic charge from the fuel cell to the supercapacitor is prevented and thereby an increase in the voltage of the supercapacitor is suitably prevented, the amount of regenerative braking is increased, thus improving the fuel efficiency.

(3) It is possible to suitably improve the durability of the fuel cell by reducing the open circuit voltage (OCV).

(4) It is possible to prevent the deterioration of the fuel cell stack, which occurs when oxygen is introduced into the anode, without a loss of improvement in fuel efficiency, and further improve the durability of the fuel cell stack by the control process of the non-power generation region, in which, if the air supply to the fuel cell stack is suitably cut off as the fuel cell stop mode is started, preferably, the hydrogen supply is not immediately cut off and, if the fuel cell voltage is eliminated after maintaining the anode pressure at an optimal level through the hydrogen supply, the load device for voltage elimination is driven and the hydrogen supply is cut off.

(5) Since the voltage unexpectedly generated in the fuel cell stack can be immediately or substantially immediately eliminated by driving the load device for voltage elimination along with the hydrogen supply cut off, it is possible to prevent the deterioration of the fuel cell stack and improve the durability of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An idle stop-start control method of a fuel cell hybrid vehicle including a fuel cell as a main power source and a storage means as an auxiliary power source, the method comprising:
    determining whether to perform a fuel cell stop mode by determining conditions for stopping power generation of the fuel cell;
    performing the fuel cell stop mode, in which a current output from a fuel cell stack is cut off, by stopping a supply of air and a supply of hydrogen to the fuel cell, if the fuel cell stop mode is determined; and
    performing a fuel cell restart mode by restarting the supply of air and hydrogen, if conditions for restarting the fuel cell are satisfied in the fuel cell stop mode wherein determining whether to perform the fuel cell stop mode comprises: comparing a voltage of the storage means with a predetermined voltage; and determining the fuel cell stop mode if a voltage of the storage means is above a reference voltage corresponding to a low power region or a regenerative braking region and if a current state is not a fuel cell warning state corresponding to deterioration of the fuel cell stack.

2. The method of claim 1, wherein the fuel cell includes a fuel cell stack and wherein performing the fuel cell stop mode comprises:
    cutting off the air supply to the fuel cell stack; and
    allowing the current output from the fuel cell to be cut off as a current generated by residual oxygen in a cathode is consumed.

3. The method of claim 2, further comprising:
    entering a non-power generation mode, if the current output from the fuel cell stack is cut off, such that pressure of an anode is maintained at a predetermined pressure for preventing oxygen from being introduced into the anode by supplying hydrogen to the fuel cell stack; and
    driving a load device for voltage elimination to prevent voltage from being generated in the fuel cell stack, if the voltage of the fuel cell stack drops to be eliminated, and cutting of the hydrogen supply.

4. The method of claim 3, further comprising:
    immediately driving the load device for voltage elimination, if the voltage does not drops, but is present, when a predetermined time has elapsed after the non-power generation mode is started in a state where the pressure of the anode is maintained at the predetermined pressure; and
    cutting off the hydrogen supply, if residual voltage is eliminated from the fuel cell stack.

5. The method of claim 3, further comprising:
    determining whether acceleration is expected after the non-power generation mode is started; and
    continuously maintaining the hydrogen supply, if the acceleration is expected.

6. The method of claim 1, wherein the fuel cell includes a fuel cell stack and wherein performing the fuel cell stop mode comprises:
    cutting off the hydrogen supply to the fuel cell stack; and
    allowing the current output from the fuel cell to be cut off by cutting off the air supply to the fuel cell stack if pressure of the anode is reduced to the predetermined pressure as a current generated by residual hydrogen in the anode is consumed.

7. The method of claim 1, wherein, in performing the fuel cell restart mode, if the conditions for restarting the fuel cell are satisfied, in which the voltage of the storage means is below the predetermined reference voltage or a load required by the vehicle is above a reference load, the fuel cell restart mode is entered by restarting the air and hydrogen supply.

* * * * *